United States Patent
Kanekawa et al.

(10) Patent No.: US 12,012,092 B2
(45) Date of Patent: Jun. 18, 2024

(54) VEHICLE CONTROL SYSTEM

(71) Applicant: Hitachi Astemo, Ltd., Hitachinaka (JP)

(72) Inventors: Nobuyasu Kanekawa, Tokyo (JP); Atsushi Arata, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 333 days.

(21) Appl. No.: 17/603,702

(22) PCT Filed: Mar. 13, 2020

(86) PCT No.: PCT/JP2020/011013
§ 371 (c)(1),
(2) Date: Oct. 14, 2021

(87) PCT Pub. No.: WO2020/213315
PCT Pub. Date: Oct. 22, 2020

(65) Prior Publication Data
US 2022/0242400 A1    Aug. 4, 2022

(30) Foreign Application Priority Data
Apr. 17, 2019   (JP) .................... 2019-078267

(51) Int. Cl.
*B60W 20/50*    (2016.01)
*B60W 10/06*    (2006.01)
(Continued)

(52) U.S. Cl.
CPC ............ *B60W 20/50* (2013.01); *B60W 10/06* (2013.01); *B60W 10/08* (2013.01); *B60W 10/18* (2013.01);
(Continued)

(58) Field of Classification Search
CPC ...... B60W 20/50; B60W 10/06; B60W 10/04; B60W 10/08; B60W 10/18; B60W 10/184;
(Continued)

(56) References Cited

U.S. PATENT DOCUMENTS 5,957,985 A * 9/1999 Wong ................. G06F 11/2035
714/13
2005/0131587 A1* 6/2005 Takamatsu ...... B60W 30/18063
701/1
(Continued)

FOREIGN PATENT DOCUMENTS

| JP | 2005-170295 A | 6/2005 |
| JP | 2005-199951 A | 7/2005 |

(Continued)

OTHER PUBLICATIONS

International Search Report with English translation and Written Opinion issued in corresponding application No. PCT/JP2020/011013 dated Jun. 30, 2020.

*Primary Examiner* — Jaime Figueroa
*Assistant Examiner* — Benjamin J Brosh
(74) *Attorney, Agent, or Firm* — Foley & Lardner LLP

(57) ABSTRACT

A vehicle control system to control a vehicle according to a travel environment of the vehicle is provided. The vehicle control system includes a sensor that detects a travel environment of the vehicle. The sensor is configured to transmit detected travel environment information. The vehicle control system further includes a first control unit configured to output a first control signal based on the travel environment information detected by the sensor and received directly from the sensor. The vehicle control system further includes a second control unit configured to receive the first control signal to output a second control signal, and a third control unit configured to receive the first control signal and the
(Continued)

second control signal to drive a control device based on either the first control signal or the second control signal.

9 Claims, 13 Drawing Sheets

(51) Int. Cl.
  *B60W 10/08* (2006.01)
  *B60W 10/18* (2012.01)
  *B60W 50/023* (2012.01)
  *B60W 50/029* (2012.01)

(52) U.S. Cl.
  CPC ........ *B60W 50/023* (2013.01); *B60W 50/029* (2013.01)

(58) Field of Classification Search
  CPC ... B60W 30/18109; B60W 2050/0292; B60W 50/023
  See application file for complete search history.

(56) References Cited

U.S. PATENT DOCUMENTS

| | | |
|---|---|---|
| 2006/0015231 A1 | 1/2006 | Yoshimura et al. |
| 2007/0156310 A1 | 7/2007 | Hirano et al. |
| 2017/0028983 A1 | 2/2017 | Fukudome |
| 2018/0257638 A1* | 9/2018 | Ortmann ............... B60W 20/30 |
| 2020/0290641 A1 | 9/2020 | Kawakami |

FOREIGN PATENT DOCUMENTS

| | | |
|---|---|---|
| JP | 2006-051922 A | 2/2006 |
| JP | 2016-199239 A | 12/2016 |
| JP | 2017-034816 A | 2/2017 |
| JP | 2018-016107 A | 2/2018 |
| JP | 2019-017182 A | 1/2019 |
| WO | WO-2018/225225 A1 | 12/2018 |

\* cited by examiner

VEHICLE CONTROL SYSTEM

TECHNICAL FIELD

The present invention relates to a vehicle control system capable of continuing control even when an abnormality occurs.

BACKGROUND ART

Full automation of control such as autonomous driving can eliminate human operation, reduce the probability of occurrence of errors due to human errors, and improve safety.

In the electronic device that controls an automobile, the possibility of continuing control at the time of failure is disclosed in PTL 1, PTL 2, PTL 3, and PTL 4.

PTL 1 discloses a means for realizing a monitoring electronic control unit (ECU) capable of preventing transmission of a control signal including an abnormal variable from an autonomous driving ECU to a driving ECU.

PTL 2 discloses a technique in which when an abnormality occurs in a control target value generated by a command controller, an actuator controller controls an actuator based on a sensor value, of a sensor controller on a network, received by the actuator controller.

PTL 3 discloses a means that accurately detects an abnormality without causing excessive load concentration when detecting an abnormality occurring in an arithmetic unit connected via a network.

PTL 4 discloses a means that determines a time at which control is switched according to a surrounding environment at the time of abnormality detection.

CITATION LIST

Patent Literature

PTL 1: JP 2018-016107 A
PTL 2: JP 2006-051922 A
PTL 3: JP 2005-199951 A
PTL 4: WO 2018/225225

SUMMARY OF INVENTION

Technical Problem

According to the conventional technique described above, it is possible to ensure continuation of control when an abnormality occurs, but it is based on redundancy of the control device, and further consideration is desired for reduction in manufacturing cost of the control device.

Therefore, an object of the present invention is to simplify a configuration of a control device having continuity of control when an abnormality occurs and reduce a manufacturing cost.

Solution to Problem

The present invention relates to a vehicle control system that controls a vehicle according to a travel environment of the vehicle. The vehicle control system includes a sensor that detects a travel environment of the vehicle, a first control unit including a processor and a memory, where the first control unit is configured to output a first control signal based on information detected by the sensor, a second control unit including a processor and a memory, the second control unit being configured to receive the first control signal to output a second control signal, and a third control unit including a processor and a memory, where the third control unit is configured to receive the first control signal and the second control signal to drive a control device based on either the first control signal or the second control signal.

Advantageous Effects of Invention

According to the present invention, when a second control unit (powertrain ECU) is normal, the control device (mechanical brake or inverter) is driven by a second control signal (brake command, inverter command) based on a first control signal (torque command) from a first control unit (AD-ECU). On the other hand, when an abnormality occurs in the second control unit, a third control unit switches a signal to the first control signal to control the control device. As a result, even when an abnormality occurs in the second control unit, the continuity of control can be secured, and the backup function can be configured to be extremely simple, and the manufacturing cost can be suppressed.

Details of at least one implementation of the subject matter disclosed herein are set forth in the accompanying drawings and the following description. Other features, aspects, and effects of the disclosed subject matter will be apparent from the following disclosure, drawings, and claims.

DESCRIPTION OF EMBODIMENTS

Hereinafter, embodiments of the present invention will be described with reference to the accompanying drawings.

First Embodiment

Figure 1:
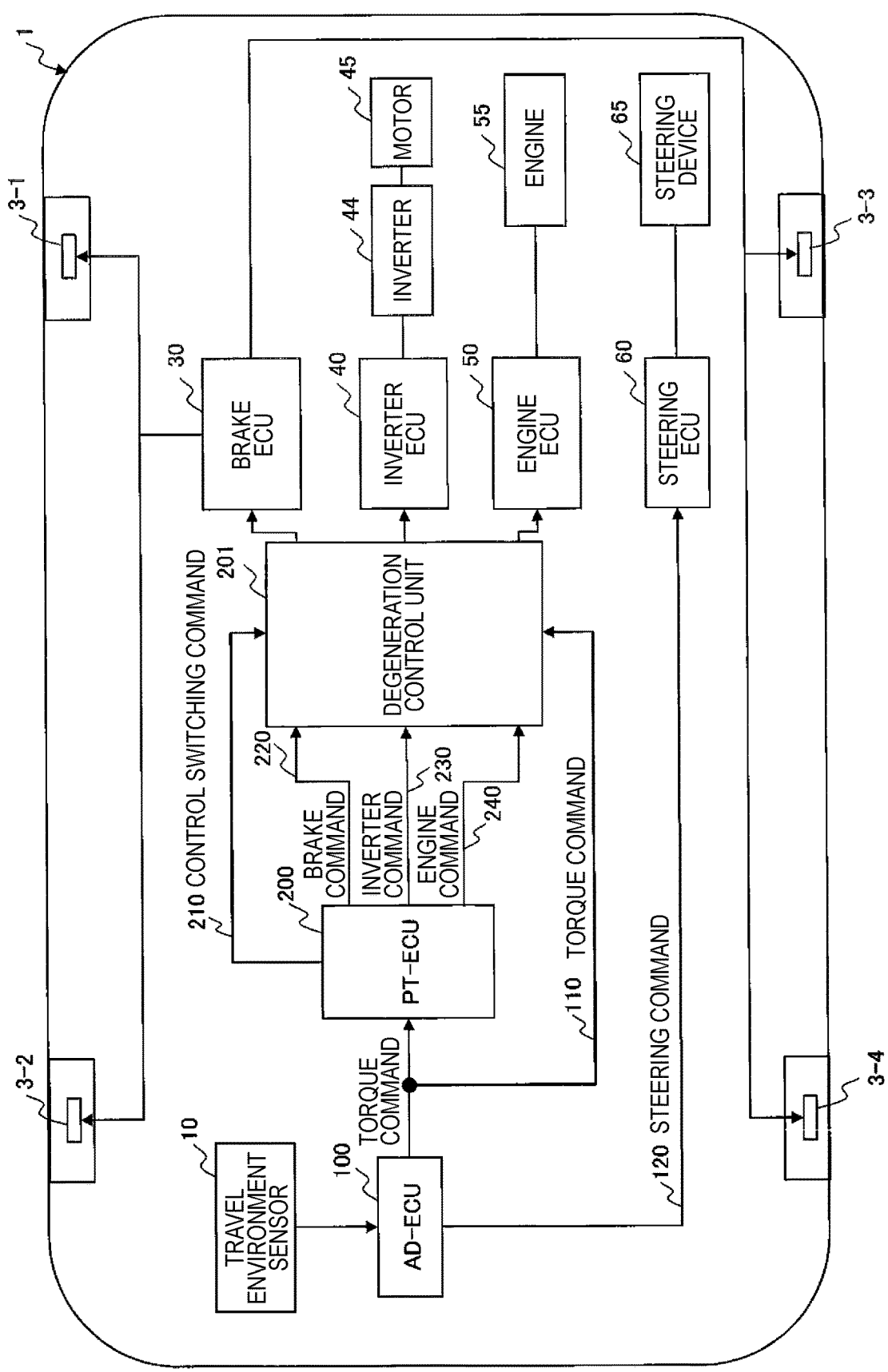
FIG. 1 is a block diagram illustrating an example of a vehicle control system in a first embodiment of the present invention.

FIG. 1 is a block diagram illustrating an example of a control system of a vehicle 1 in the first embodiment of the present invention. The vehicle 1 includes an autonomous driving ECU 100 (hereinafter, referred to as an AD-ECU 100) that performs autonomous driving based on data acquired from a travel environment sensor 10 that detects a surrounding situation or a traveling state of the vehicle 1, and controls traveling of the vehicle.

The travel environment sensor 10 can be, for example, an optical distance measuring device, a distance measuring device by an electromagnetic wave, a camera, a sonar, or the like, and detects an obstacle or a white line around a vehicle 1. Position information measured by a global positioning system (GPS) may be used as the travel environment.

The travel environment sensor 10 can be, for example, a sensor that detects the travel state of the vehicle 1, such as a vehicle speed sensor, a wheel speed sensor, a steering angle sensor, an acceleration sensor, a temperature sensor, an atmospheric pressure sensor, or a water droplet sensor.

The vehicle 1 includes a motor 45 and an engine 55 as power sources, a steering device 65 that performs steering, and mechanical brakes 3-1 to 3-4 that perform braking.

In the following description, when the mechanical brake is not individually specified, a reference sign "3" in which "-" and subsequent signs are omitted is used. The same applies to reference numerals of other components.

The AD-ECU 100 calculates a torque command (signal) 110 and a steering command (signal) 120 based on the detected travel environment to transmit the torque command and the steering command to each control device. The vehicle 1 includes a brake ECU 30 that controls a mechanical brake 3, an inverter ECU 40 that controls the motor 45 via an inverter 44, an engine ECU 50 that controls the engine 55, and a steering ECU 60 that controls the steering device 65.

The steering ECU 60 controls the steering angle of the steering device 65 based on the steering command 120 from the AD-ECU 100.

The torque command output from the AD-ECU 100 is input to a powertrain ECU 200 (hereinafter, referred to as a PT-ECU 200). The PT-ECU 200 calculates an engine command (signal) 240 and an inverter command (signal) 230 that controls the driving force and a brake command (signal) 220 that controls the braking force so as to obtain the optimum driving force or braking force based on the requested torque command and the state of the vehicle 1, to output them to a degeneration control unit 201.

In addition, the PT-ECU 200 calculates a control switching command (signal) 210 indicating the presence or absence of its own failure to transmit the control switching command to the degeneration control unit 201. The control switching command 210 is a signal indicating PT-ECU: OK in a normal case, and is a signal indicating PT-ECU: NG in a case where an abnormality occurs. Note that the abnormality in the present embodiment is not limited to a physical failure or damage, but includes an abnormality such as a soft error.

When an abnormality occurs in the PT-ECU 200, the degeneration control unit 201 calculates the brake command 220, the inverter command 230, and the engine command 240 necessary for traveling (acceleration/deceleration) from the torque command output from the AD-ECU 100 to output them.

When the PT-ECU 200 is normal, the degeneration control unit 201 outputs the brake command 220 to the brake ECU 30, outputs the inverter command 230 to the inverter ECU 40, and output the engine command 240 to the engine ECU 50.

The brake ECU 30 drives an actuator (not illustrated) based on the brake command 220 to control the braking force. As the actuator, for example, a hydraulic pressure generation device or the like can be used.

The engine ECU 50 drives an actuator (not illustrated) based on the engine command 240 to control a driving force to drive the engine 55. As the actuator, for example, a fuel injection valve, an electronic control throttle, a variable valve control device, or the like can be used.

The inverter ECU 40 controls the inverter 44 based on the inverter command 230 to drive the motor 45.

The brake ECU 30, the inverter ECU 40, and the engine ECU 50 are devices that control control devices such as an actuator and the inverter 44.

The degeneration control unit 201, instead of the PT-ECU 200 in which the abnormality occurs, calculates a torque command (abnormal-time torque command) necessary for traveling to continue traveling.

The PT-ECU 200 makes a determination of the driving force when the value of the torque command 110 is positive, and makes a determination of the braking force when the value is negative. In addition, the PT-ECU 200 can use a vehicle speed and a state of charge of a battery (not illustrated) as the state of the vehicle 1.

Figure 2A:
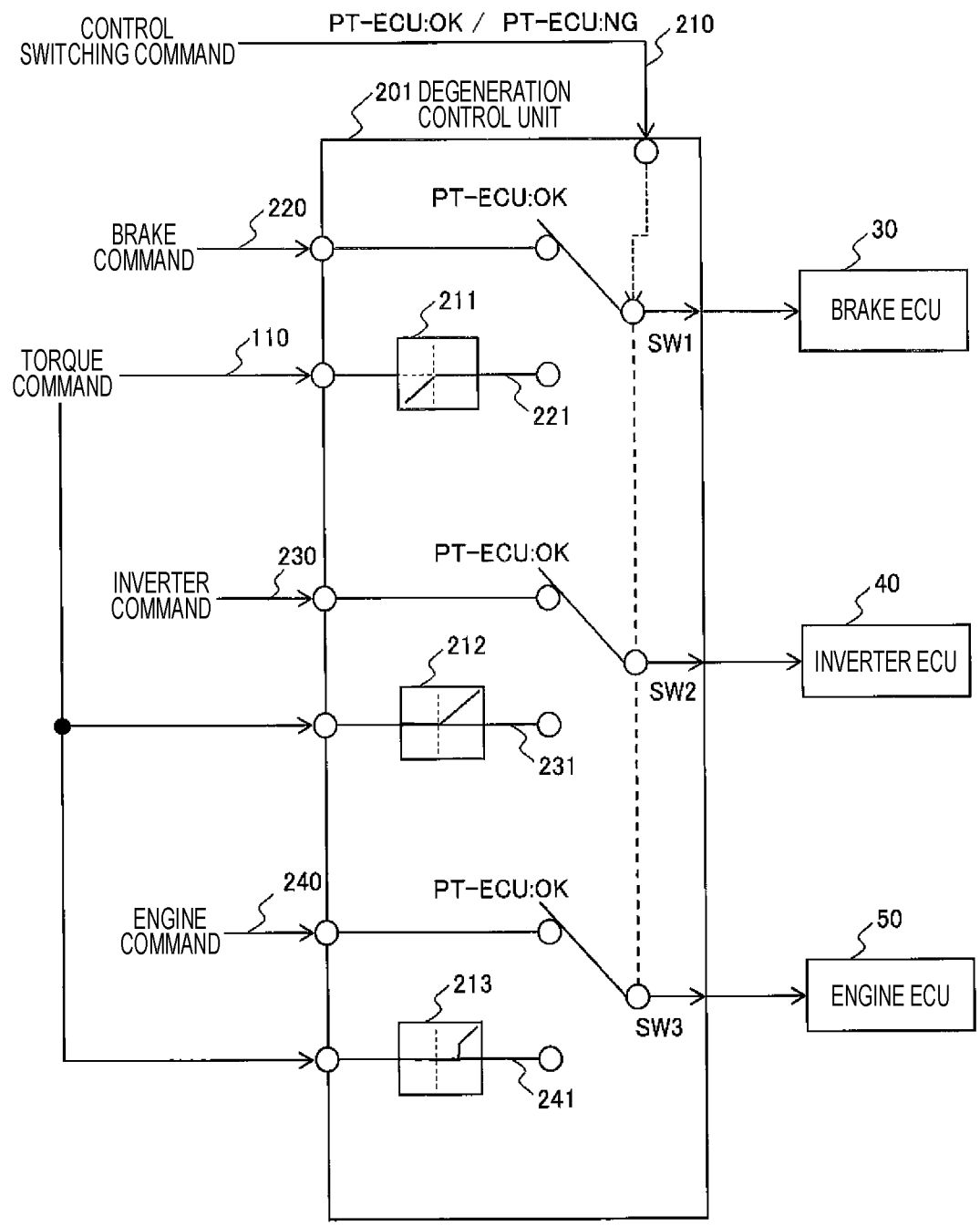
FIG. 2A is a block diagram illustrating an example of a function of a degeneration control unit in the first embodiment of the present invention.

FIG. 2A is a block diagram illustrating an example of a function of the degeneration control unit 201. The degeneration control unit 201 switches the generation sources of the brake command, the inverter command, and the engine command to be output according to the value of the control switching command 210 to transmit the commands of the respective torques to the brake ECU 30, the inverter ECU 40, and the engine ECU 50.

The degeneration control unit 201 includes an auxiliary brake control unit 211 that calculates an abnormal-time brake command 221 that commands the brake ECU 30 from a negative value of the torque command 110 from the AD-ECU 100, and a switch SW1 that switches between the brake command 220 from the PT-ECU 200 and the abnormal-time brake command 221 from the auxiliary brake control unit 211 based on the control switching command 210.

In addition, the degeneration control unit 201 includes an auxiliary inverter control unit 212 that calculates an abnormal-time inverter command (inverter acceleration command) 231 that commands the inverter ECU 40 to control a torque value until a positive value of the torque command 110 from the AD-ECU 100 reaches a predetermined value, and a switch SW2 that switches between the inverter command 230 from the PT-ECU 200 and the abnormal-time inverter command 231 from the auxiliary inverter control unit 212 based on the control switching command 210.

In addition, the degeneration control unit 201 includes an auxiliary engine control unit 213 that calculates an abnormal-time engine command 241 that commands the engine ECU 50 to control a torque value when the value of the torque command 110 from the AD-ECU 100 is equal to or greater than a predetermined value, and a switch SW3 that switches between the engine command 240 from the PT-ECU 200 and the abnormal-time engine command 241 from the auxiliary engine control unit 213 based on the control switching command 210.

The switches SW1 to SW3 select the brake command 220, the inverter command 230, and the engine command 240 from the PT-ECU 200, respectively, when the control switching command 210 is normal (PT-ECU: OK), and select the abnormal-time brake command 221, the abnormal-time inverter command 231, and the abnormal-time engine command 241 that were calculated to output them to respective ECUs when the control switching command 210 is abnormal (PT-ECU: NG).

Figure 2B:
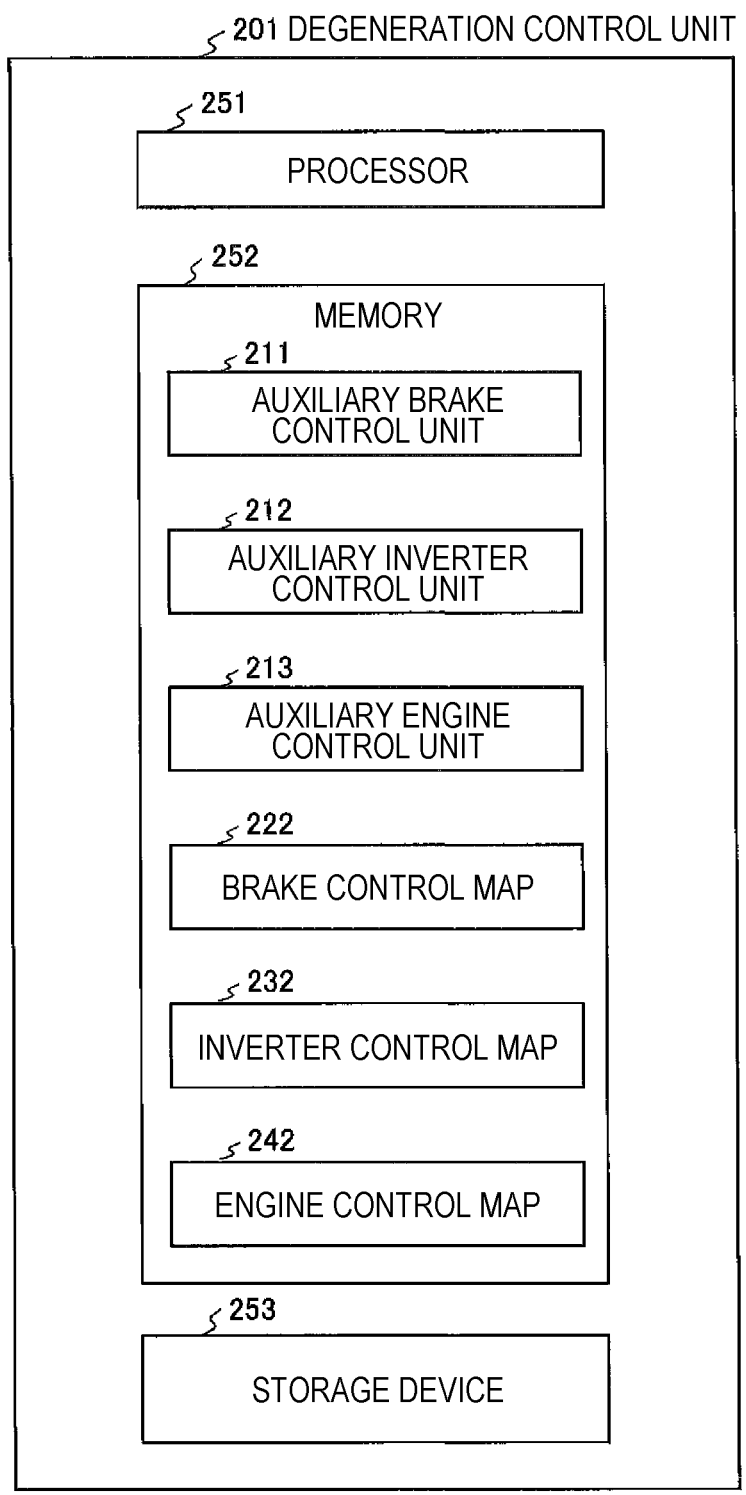
FIG. 2B is a block diagram illustrating an example of a configuration of the degeneration control unit in the first embodiment of the present invention.

FIG. 2B is a block diagram illustrating an example of a configuration of the degeneration control unit 201. The degeneration control unit 201 is a computer including a processor 251, a memory 252, and a storage device 253.

The memory 252 stores the auxiliary brake control unit 211, the auxiliary inverter control unit 212, and the auxiliary engine control unit 213.

The functional units of the auxiliary brake control unit 211, the auxiliary inverter control unit 212, and the auxiliary engine control unit 213 are loaded into the memory 252 as programs.

The processor 251 operates as a functional unit that provides a predetermined function by executing processing according to the program of each functional unit. For example, the processor 251 functions as the auxiliary brake control unit 211 by executing processing according to the brake control program. The same applies to other programs. Further, the processor 251 also operates as a functional unit that provides a function of each of a plurality of processes executed by each program. A computer and a computer system are a device and a system including these functional units.

Figure 3A:
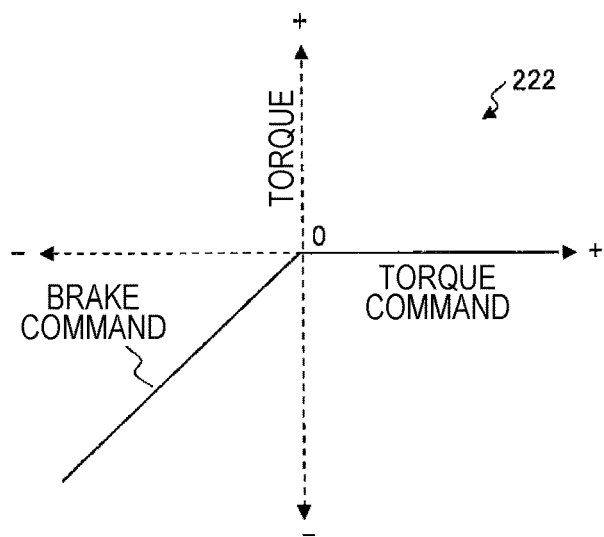
FIG. 3A is a diagram illustrating an example of control performed by an auxiliary brake control unit in the first embodiment of the present invention.

FIG. 3A is a diagram illustrating an example of control performed by the auxiliary brake control unit 211. When the torque command 110 is negative, the auxiliary brake control unit 211 outputs the torque command as the abnormal-time brake command 221.

The auxiliary brake control unit 211 may calculate the abnormal-time brake command 221 so that the torque (braking force) command value in the negative direction increases as the torque command 110 increases in the negative direction.

Figure 3B:
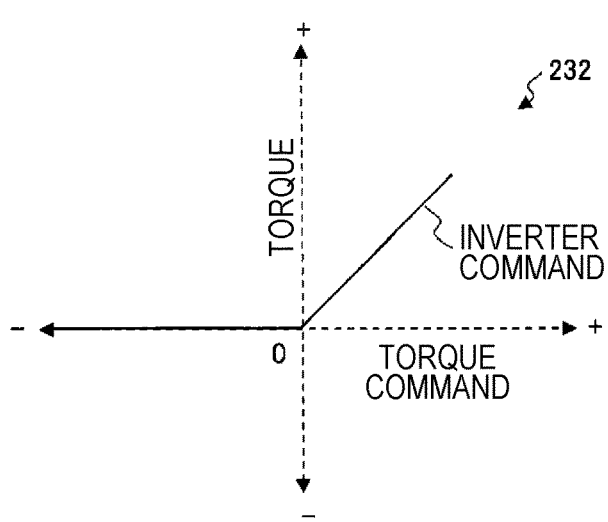
FIG. 3B is a diagram illustrating an example of control performed by an auxiliary inverter control unit in the first embodiment of the present invention.

FIG. 3B is a diagram illustrating an example of control performed by the auxiliary inverter control unit 212. When the value of the torque command 110 is positive and equal to or less than a threshold value Tq1, the auxiliary inverter control unit 212 outputs the torque command 110 as the abnormal-time inverter command 231.

When the value of the torque command 110 is equal to or less than the threshold value Tq1, the auxiliary inverter control unit 212 may calculate the abnormal-time inverter command 231 so that the torque command value in the positive direction (acceleration driving force) increases as the value of the torque command 110 increases in the positive direction.

Figure 3C:
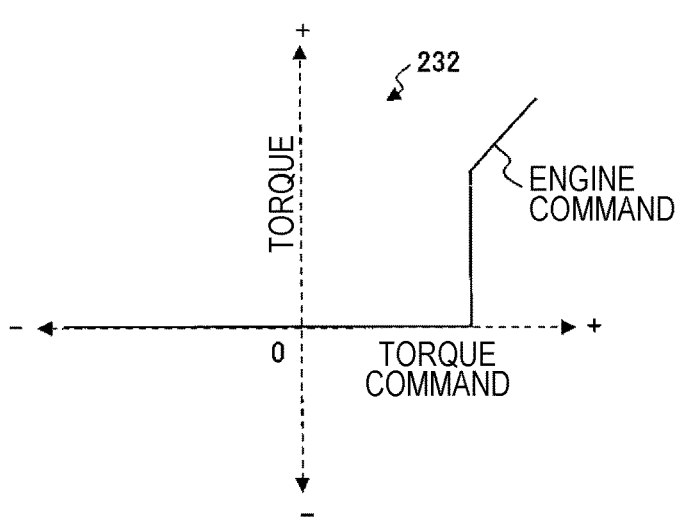
FIG. 3C is a diagram illustrating an example of control performed by an auxiliary engine control unit in the first embodiment of the present invention.

FIG. 3C is a diagram illustrating an example of control performed by the auxiliary engine control unit 213. When the value of the torque command 110 is positive and exceeds the threshold value Tq1, the auxiliary engine control unit 213 outputs the torque command 110 as the abnormal-time engine command 241.

When the value of the torque command 110 exceeds the threshold value Tq1, the auxiliary inverter control unit 212 may calculate the abnormal-time engine command 241 so that the torque command value in the positive direction (acceleration driving force) increases as the torque command 110 increases.

Figure 4:
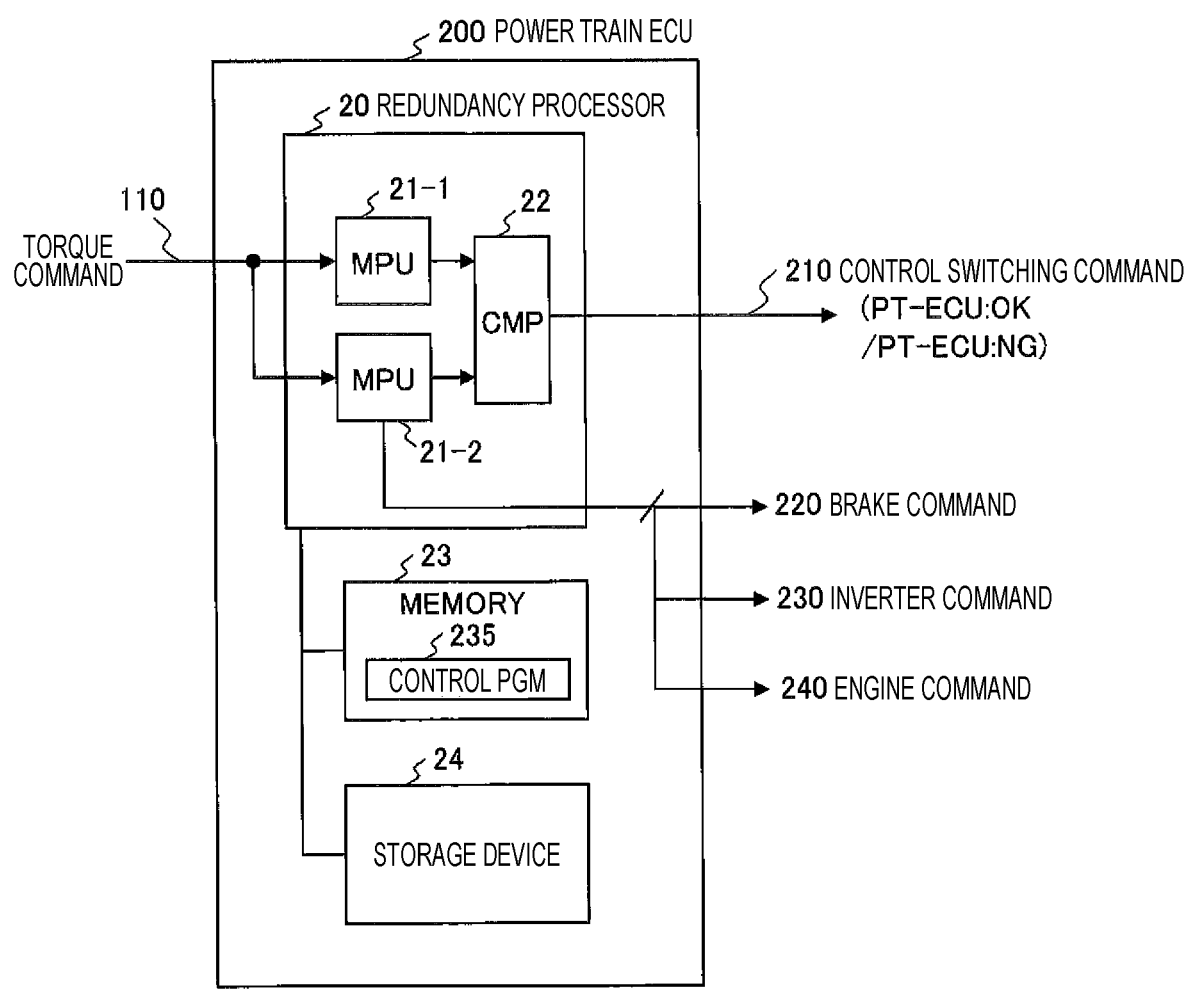
FIG. 4 is a block diagram illustrating an example of a powertrain ECU in the first embodiment of the present invention.

FIG. 4 is a block diagram illustrating an example of a configuration of the PT-ECU 200. The PT-ECU 200 is a computer including a redundancy processor 20 including two micro-processing units (MPUs) 21-1 and 21-2 and a comparator 22 in a chip, a memory 23, and a storage device 24.

A control program 235 is loaded into the memory 23 and executed by the redundancy processor 20. The control program 235 generates the brake command 220, the inverter command 230, and the engine command 240 having the best energy efficiency in order to realize the torque command 110 from the AD-ECU 100.

In addition, the control program 235 causes the processor to execute a predetermined calculation for calculating the control switching command 210 indicating whether an abnormality occurs in the PT-ECU 200. The control program 235 causes the two MPUs 21-1 and 21-2 to execute the same calculation to output the two calculation results to the comparator 22. When the two calculation results are the same, the comparator 22 outputs a value indicating that the PT-ECU 200 is normal (PT-ECU: OK) as the control switching command 210. On the other hand, when the two calculation results are different, the comparator outputs a value indicating that the PT-ECU 200 is abnormal (PT-ECU: NG) as the control switching command 210.

As described above, when the PT-ECU 200 is normal (PT-ECU: OK), the SW1, the SW2, and the SW3 of the degeneration control unit 201 are switched to the upper side (PT-ECU: OK) in FIG. 2A, and the brake ECU 30 controls the mechanical brake 3 attached to the wheel based on the brake command 220. Similarly, the inverter ECU 40 controls the inverter 44 based on the inverter command 230 to drive the motor 45 to generate the acceleration/deceleration torque. The engine ECU 50 similarly controls the driving force of the engine 55 based on the engine command 240.

A method of controlling the engine 55 differs depending on the type of the vehicle 1. In the hybrid vehicle, when the torque command 110 is small, the engine command 240 stops the engine at 0, and when the torque command 110 is large, the engine command 240 has a positive value and generates a driving force. The threshold value for determining the magnitude of the torque command 110 is determined by a charge capacity SoC(State of Charge) of a battery (not illustrated), an outside air temperature, a vehicle inside temperature, gradient information, and the like.

For example, when the charge capacity SoC of the battery decreases, the threshold value of the torque command 110 is decreased to start the operation of the engine 55 in order to avoid a decrease in the charge capacity of the battery. When the outside air temperature or the vehicle inside air temperature is low, the operation of the engine 55 is started at a lower threshold value of the torque command 110 in order to utilize heat generated by the operation of the engine 55 for heating.

When the road on which the vehicle is traveling has an upward slope, since a decrease in the charge capacity SoC of the battery is expected in the future, the operation of the engine 55 is started at a lower threshold value of the torque command 110, and the decrease in the charge capacity SoC is suppressed.

When the road on which the vehicle is traveling for charging has a downward slope, since an increase in the charge capacity SoC of the battery is expected by regenerative braking, the operation of the engine 55 is started at a higher threshold value of the torque command 110.

On the other hand, in the vehicle 1 of a type in which the vehicle is mainly driven by a battery charged in advance by an external power source such as a commercial power source, the engine 55 is operated when the charge capacity of the battery decreases, and the battery is charged by a generator (not illustrated) mechanically connected to the engine 5, the engine 55 is stopped when the charge capacity SoC of the battery is equal to or greater than a certain value, and the engine 55 is operated and the battery is charged when the charge capacity SoC of the battery is less than the certain value.

When the PT-ECU 200 is abnormal (PT-ECU: NG), the switches SW1, SW2, and SW3 of the degeneration control unit 201 are switched to the lower side (PT-ECU: NG) in FIG. 2A, and the brake ECU 30 controls the mechanical brake 3 attached to the wheel according to the abnormal-time brake command 221 calculated by the degeneration control unit 201 based on the negative value of the torque command 110.

Similarly, the inverter ECU 40 controls the inverter 44 based on the positive value of the torque command 110 to drive the motor 45 and generate an acceleration torque (or driving force).

When the PT-ECU 200 is abnormal (PT-ECU: NG), it is not always necessary to start the engine 55 as long as the charge capacity SoC of the battery is sufficient, but the engine ECU 50 may similarly control the engine 55 based on the torque command 110 or the charge capacity SoC of the battery. In this case, in the hybrid vehicle, when the torque command 110 is less than a predetermined certain value, the engine command 240 stops the engine 55 at "0", and the engine command has a positive value when the torque command 110 is equal to or greater than the certain value, and the driving force is generated by the engine 55.

Note that as in the degeneration control unit 201 and the PT-ECU 200, the brake ECU 30, the inverter ECU 40, and the engine ECU 50 can be configured by a computer having a processor, a memory, and a storage device.

Figure 5:
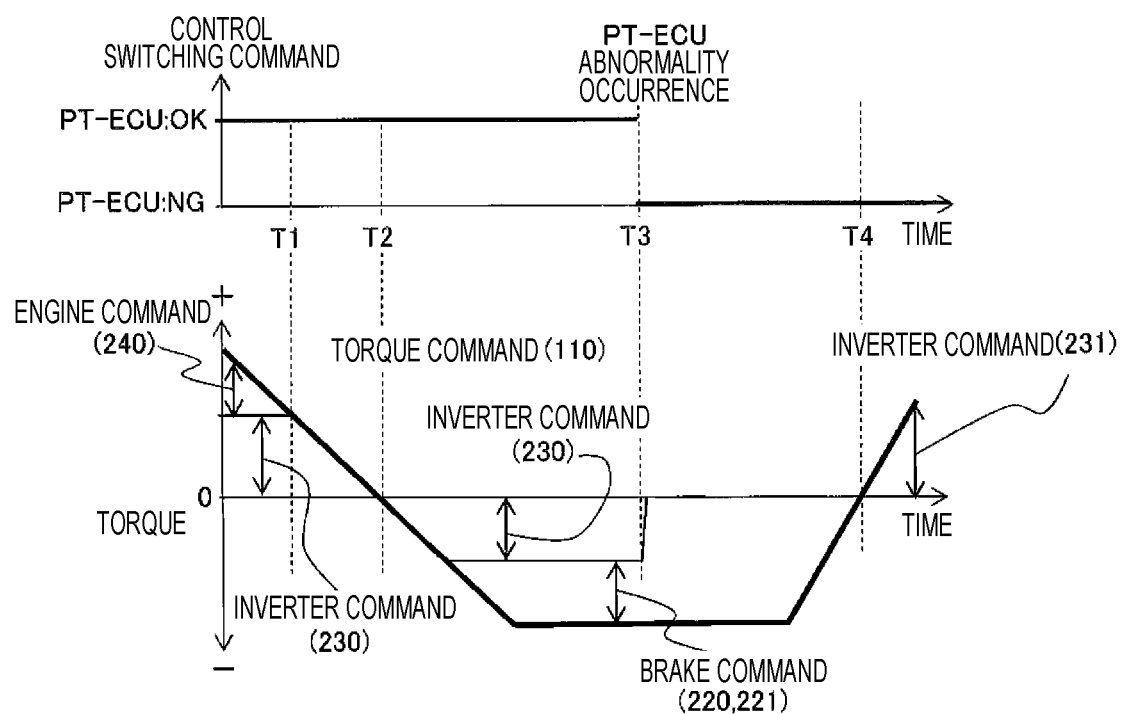
FIG. 5 is a graph illustrating a relationship between a control switching signal, a torque command, and time in the first embodiment of the present invention.

FIG. 5 is a graph illustrating a relationship between a control switching signal, a torque command, and time. The illustrated example is an example of control in a case where the PT-ECU 200 transitions from a normal state (PT-ECU: OK) to a state in which an abnormality has occurred (PT-ECU: NG) at time T3.

In the PT-ECU 200, as illustrated in FIG. 4, when the two MPUs 21-1 and 21-2 of the redundancy processor 20 are normal, the comparison results in the comparator 22 match, and the control switching command 210 represents PT-ECU: OK.

When the control switching command 210 before time T3 is normal (PT-ECU: OK), the switches SW1, SW2, and SW3 of the degeneration control unit 201 are switched to the upper side (PT-ECU: OK) in FIG. 2A.

In a period before time T2 in which the torque command 110 has a positive value, the inverter ECU 40 controls the inverter 44 based on the inverter command 230 to drive the motor to generate an acceleration/deceleration torque.

Further, in FIG. 5, in a period in which the torque command 110 before time T1 has a certain value or more, the engine ECU 50 drives the engine 55 based on the engine command 240 from the PT-ECU 200 to generate a driving force.

During a period from time T2 to time T3 in which the torque command 110 has a negative value, in addition to the braking force (power generation) by the motor 45, the brake ECU 30 similarly controls the mechanical brake 3 attached to the wheel based on the brake command 220. As described above, the PT-ECU 200 can efficiently recover the kinetic energy as the electric energy by controlling the use ratio of the regenerative brake and the mechanical brake 3 according to the charge capacity SoC or the like.

When the calculation results of the two MPUs 21-1 and 21-2 are abnormal in the PT-ECU 200, the comparison results in the comparator 22 do not match, and the control switching command 210 represents PT-ECU: NG.

When the abnormality (PT-ECU: NG) of the PT-ECU 200 occurs after time T3, the SW1, the SW2, and the SW3 are switched to the lower side (PT-ECU: NG) in FIG. 2A. After time T3, the abnormal-time brake command 221 from the auxiliary brake control unit 211, the abnormal-time inverter command 231 from the auxiliary inverter control unit 212, and the abnormal-time engine command 241 from the auxiliary engine control unit 213 are output from the SW1 to SW3, respectively. That is, according to the change in the control switching command 210, the degeneration control unit 201 switches the output from the PT-ECU 200 to the command generated by the degeneration control unit 201.

In a period from time T3 and time T4 in which the torque command 110 has a negative value, the abnormal-time inverter command 231 represents "0" under the control of the auxiliary inverter control unit 212 in FIG. 3B, and the regenerative brake stops. On the other hand, the abnormal-time brake command 221 increases under the control of the auxiliary brake control unit 211 in FIG. 3A. As a result, the brake ECU 30 controls the mechanical brake 3 attached to the wheel by the abnormal-time brake command 221 based on the negative value of the torque command 110.

In a period after time T4 in which the torque command 110 has a positive value, the abnormal-time inverter command 231 increases under the control of the auxiliary inverter control unit 212 in FIG. 3B. The inverter ECU 40 drives the motor 45 by the abnormal-time inverter command 231 based on the positive value of the torque command 110 to generate the driving force.

As described above, in the first embodiment, when the PT-ECU 200 is normal, the optimal brake control and the inverter control can be realized based on the torque command 110 from the AD-ECU 100, and the operation with high energy efficiency can be realized. Specifically, it is possible to perform acceleration with high energy efficiency in which the motor 45 and the engine 55 are operated in cooperation, and deceleration with high energy efficiency in which the regenerative brake using the motor 45 as a generator and the mechanical brake 3 compensate for the braking force insufficient by the regenerative brake.

On the other hand, when an abnormality occurs in the PT-ECU 200, simple control by the auxiliary brake control unit 211, the auxiliary inverter control unit 212, and the auxiliary engine control unit 213 by the degeneration control unit 201 is performed without using the optimization function of the PT-ECU 200.

The degeneration control unit 201 realizes acceleration/deceleration according to the torque command 110 from the AD-ECU 100 by driving the mechanical brake 3 by the abnormal-time brake command 221 at the time of deceleration and switching the motor 45 and the engine 55 by the abnormal-time inverter command 231 and the abnormal-time engine command 241 at the time of acceleration to perform driving.

The degeneration control unit 201 controls the torque according to the torque command 110 by any one of the auxiliary brake control unit 211, the auxiliary inverter control unit 212, and the auxiliary engine control unit 213, so that it is possible to continue traveling of the vehicle 1 while simplifying the control content and reducing the manufacturing cost of the degeneration control unit 201.

Since the degeneration control unit 201 of the first embodiment may be installed at the preceding stage of the brake ECU 30, the inverter ECU 40, and the engine ECU 50, it is possible to suppress an increase in manufacturing cost.

Second Embodiment

Figure 6:
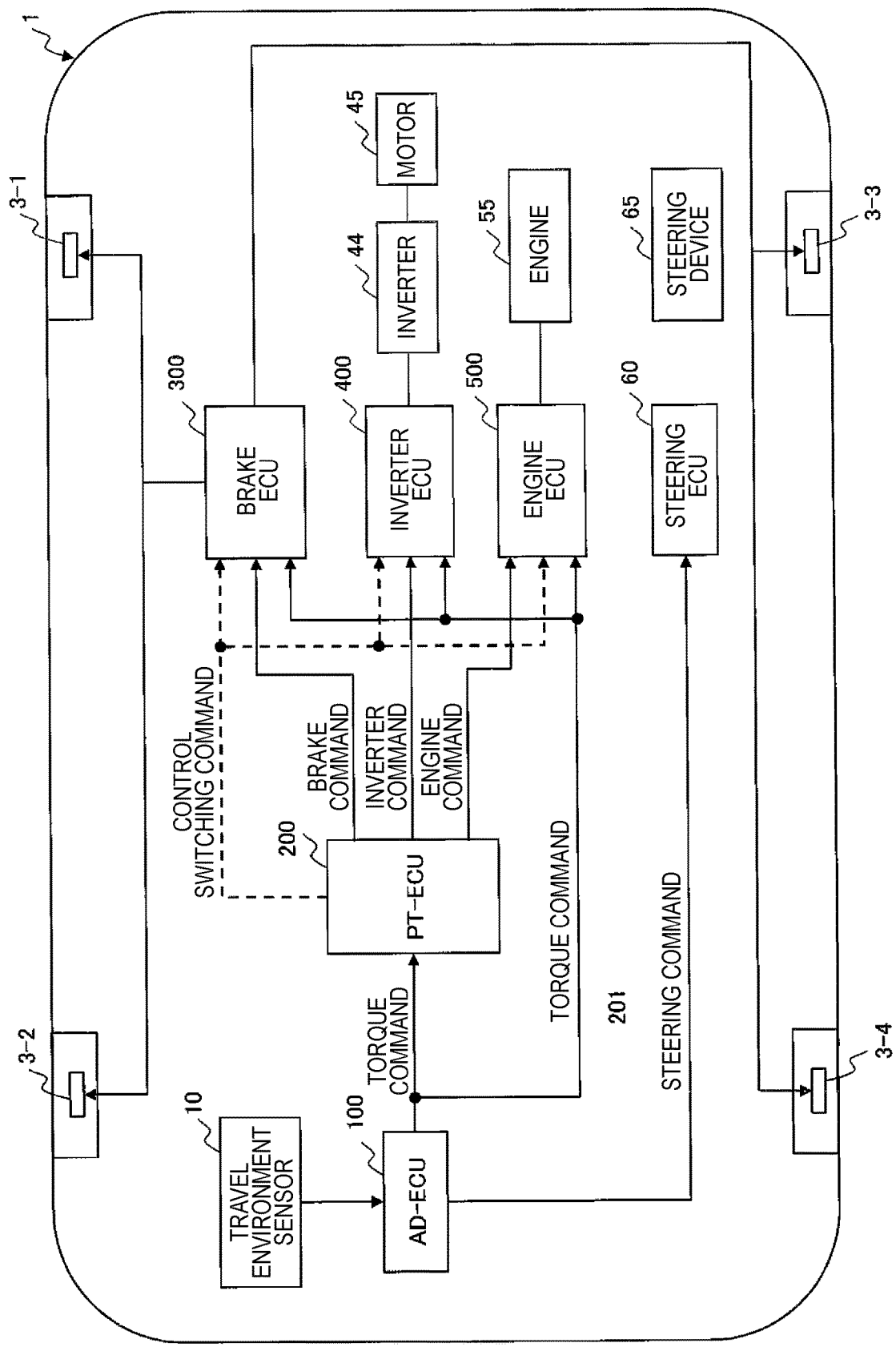
FIG. 6 is a block diagram illustrating an example of a vehicle control system in a second embodiment of the present invention.

FIG. 6 is a block diagram illustrating an example of a control device of the vehicle 1 in the second embodiment of the present invention. In the second embodiment, the functions of the switches SW1 to SW3 of the degeneration control unit 201, the auxiliary brake control unit 211, the auxiliary inverter control unit 212, and the auxiliary engine control unit 213 described in the first embodiment are distributed to the ECUs.

Figure 7:
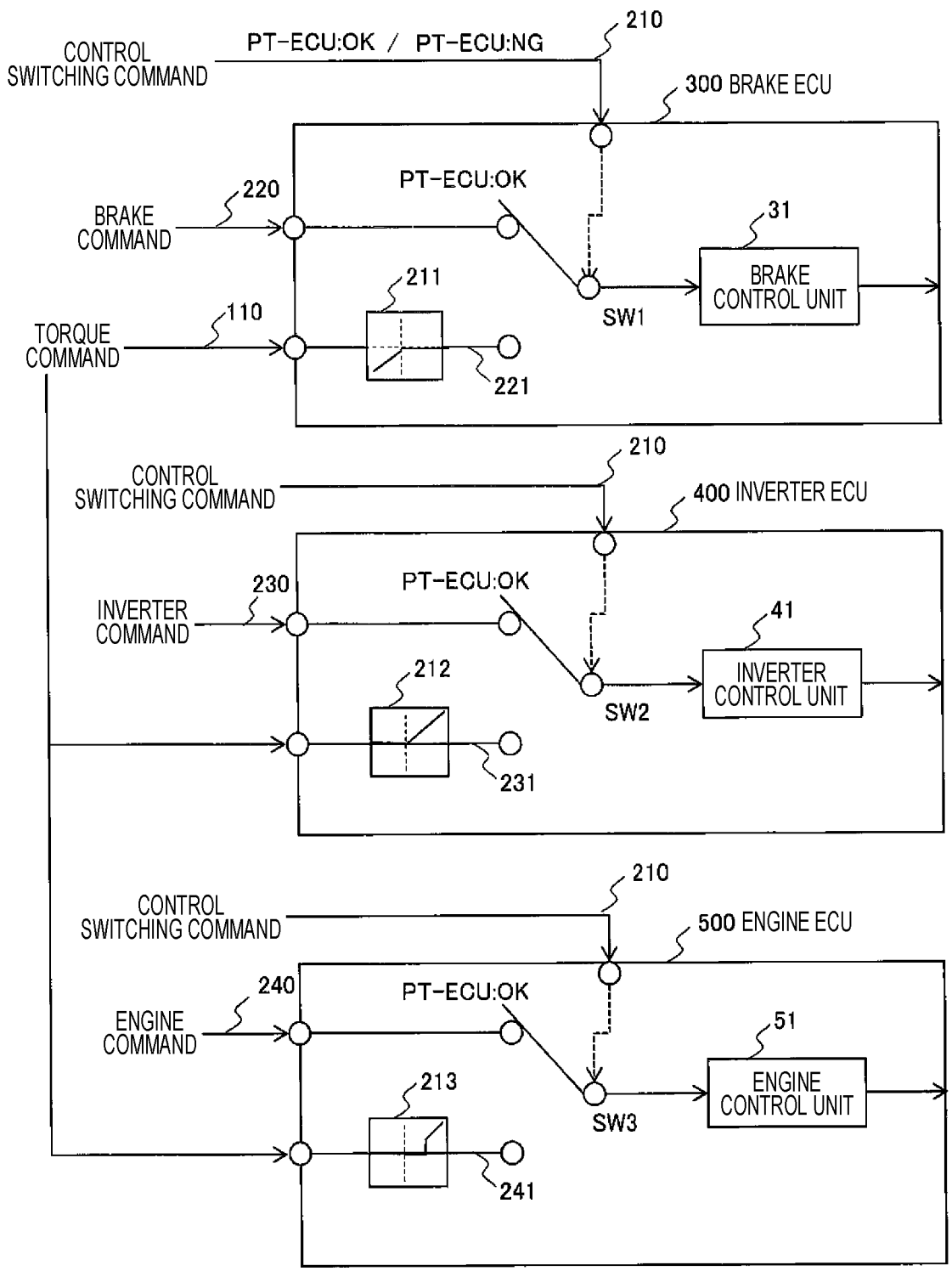
FIG. 7 is a block diagram illustrating an example of a brake ECU, an inverter ECU, and an engine ECU in the second embodiment of the present invention.

FIG. 7 is a block diagram illustrating an example of a function of each ECU. The brake ECU 300 includes a brake control unit 31 that provides a function of the brake ECU of the first embodiment, the auxiliary brake control unit 211 that calculates an abnormal-time brake command 221 from the torque command 110 when an abnormality occurs in the PT-ECU 200, and the switch SW1 that switches a signal to be input to the brake control unit 31 to the brake command 220 or the abnormal-time brake command 221 in response to the control switching command 210 from the PT-ECU 200.

The inverter ECU 400 includes an inverter control unit 41 that provides the function of the inverter ECU 40 of the first embodiment, the auxiliary inverter control unit 212 that calculates the abnormal-time inverter command 231 from the torque command 110 when an abnormality occurs in the PT-ECU 200, and the switch SW2 that switches a signal to be input to the inverter control unit 41 to the inverter command 230 or the abnormal-time inverter command 231 in response to the control switching command 210 from the PT-ECU 200.

The engine ECU 500 includes an engine control unit 51 that provides a function of the engine ECU 50 according to the first embodiment, the auxiliary engine control unit 213 that calculates the abnormal-time engine command 241 from the torque command 110 when an abnormality occurs in the PT-ECU 200, and the switch SW3 that switches a signal to be input to the engine control unit 51 to the engine command 240 or the abnormal-time engine command 241 in response to the control switching command 210 from the PT-ECU 200.

When an abnormality occurs in the PT-ECU 200, the mechanical brake 3 is driven by the abnormal-time brake command 221 at the time of deceleration, and the motor 45 and the engine 55 are switched and driven by the abnormal-time inverter command 231 and the abnormal-time engine command 241 at the time of acceleration, so that acceleration and deceleration according to the torque command 110 from the AD-ECU 100 can be realized.

In the second embodiment described above, by omitting the degeneration control unit 201, it is possible to continue traveling of the vehicle 1 while suppressing manufacturing cost for securing redundancy.

In the first embodiment, when the degeneration control unit 201 fails, it is a single failure point that affects the failure of the entire control system of the vehicle 1. Therefore, when the failure of the degeneration control unit 201 is a problem, it is necessary to make the degeneration control unit 201 redundant.

As illustrated in FIG. 7, in the second embodiment, since there is no portion that is a single failure point, reliability can be secured without further redundancy. In addition, since it is possible to generate command values of the brake control unit 31, the inverter control unit 41, and the engine control unit 51 only by determining whether the torque command 110 is positive or negative and calculating an absolute value, it is possible to suppress complication of the brake ECU 300, the inverter ECU 400, and the engine ECU 500 and to minimize an increase in manufacturing cost.

Third Embodiment

Figure 8:
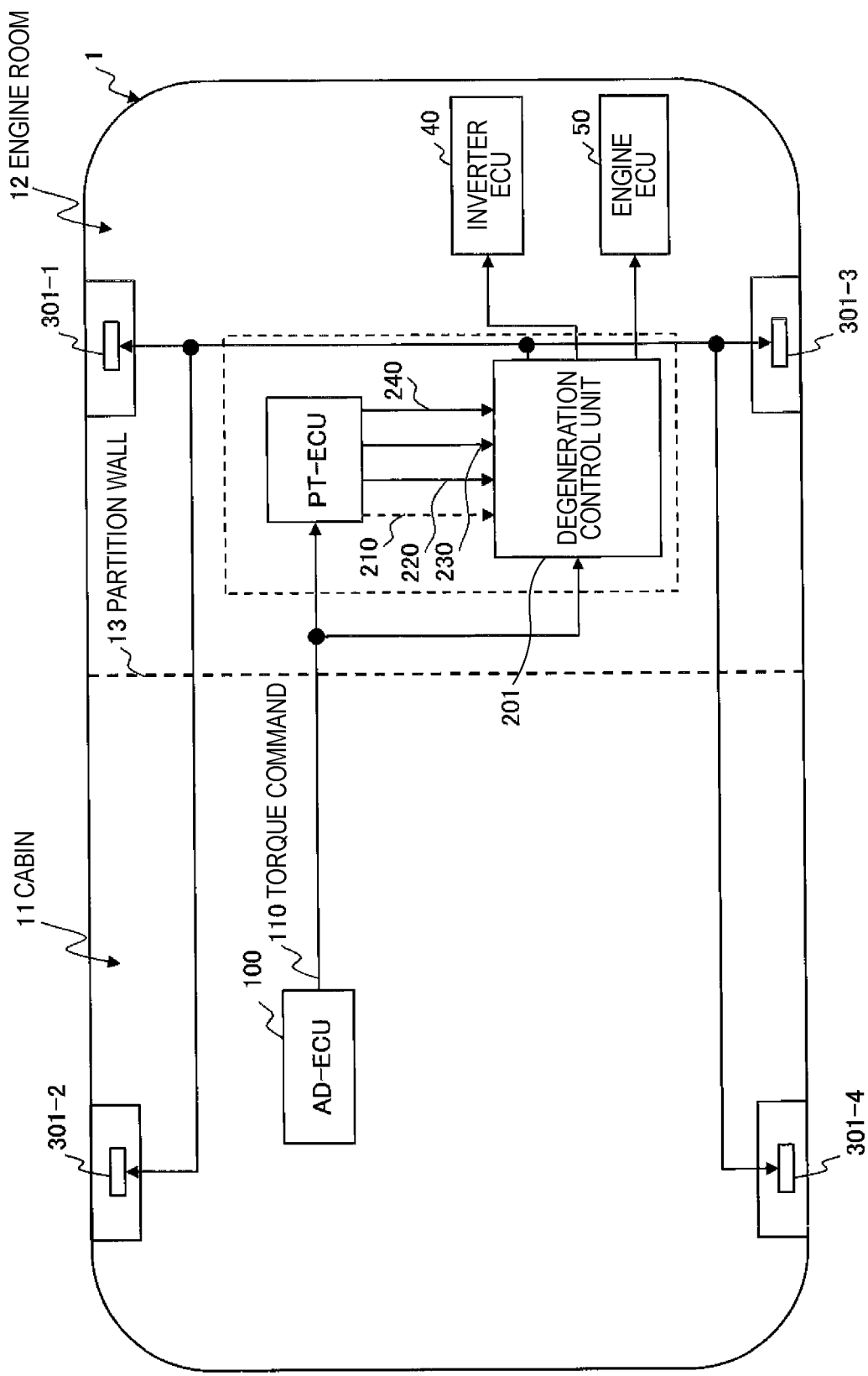
FIG. 8 is a block diagram illustrating an example of a vehicle system in a third embodiment of the present invention.

FIG. 8 is a block diagram illustrating an example of a control system of the vehicle 1 in the third embodiment of the present invention. The vehicle 1 has a space of an engine room 12 and a cabin 11 via a partition wall 13.

Since the AD-ECU 100 is required to have a high processing performance and has a large heat generation, it is disposed in the cabin 11 in which air conditioning is provided, and the other ECUs are disposed in the engine room 12. In the third embodiment, the mechanical brakes 301-1 to 301-4 in which the mechanical brake 3 and the brake ECU 30 of the first embodiment are integrated are used. The mechanical brakes 301-2 and 301-4 for the rear wheels are disposed at the rear of the vehicle 1. Other configurations are similar to those of the first embodiment.

By installing the PT-ECU 200 and the degeneration control unit 201 in the engine room 12, the network connection length with each ECU (brake ECU 30, inverter ECU 40, engine ECU 50) can be shortened. The distance between the AD-ECU 100, and the PT-ECU 200 and the degeneration control unit 201 increases, but a signal of only the torque command 110 is transmitted in this line.

In the third embodiment, the cooling of the AD-ECU 100 can be promoted and the stable operation can be guaranteed by optimizing the arrangement in the vehicle 1 in view of the generated heat amount of each ECU.

Fourth Embodiment

Figure 9:
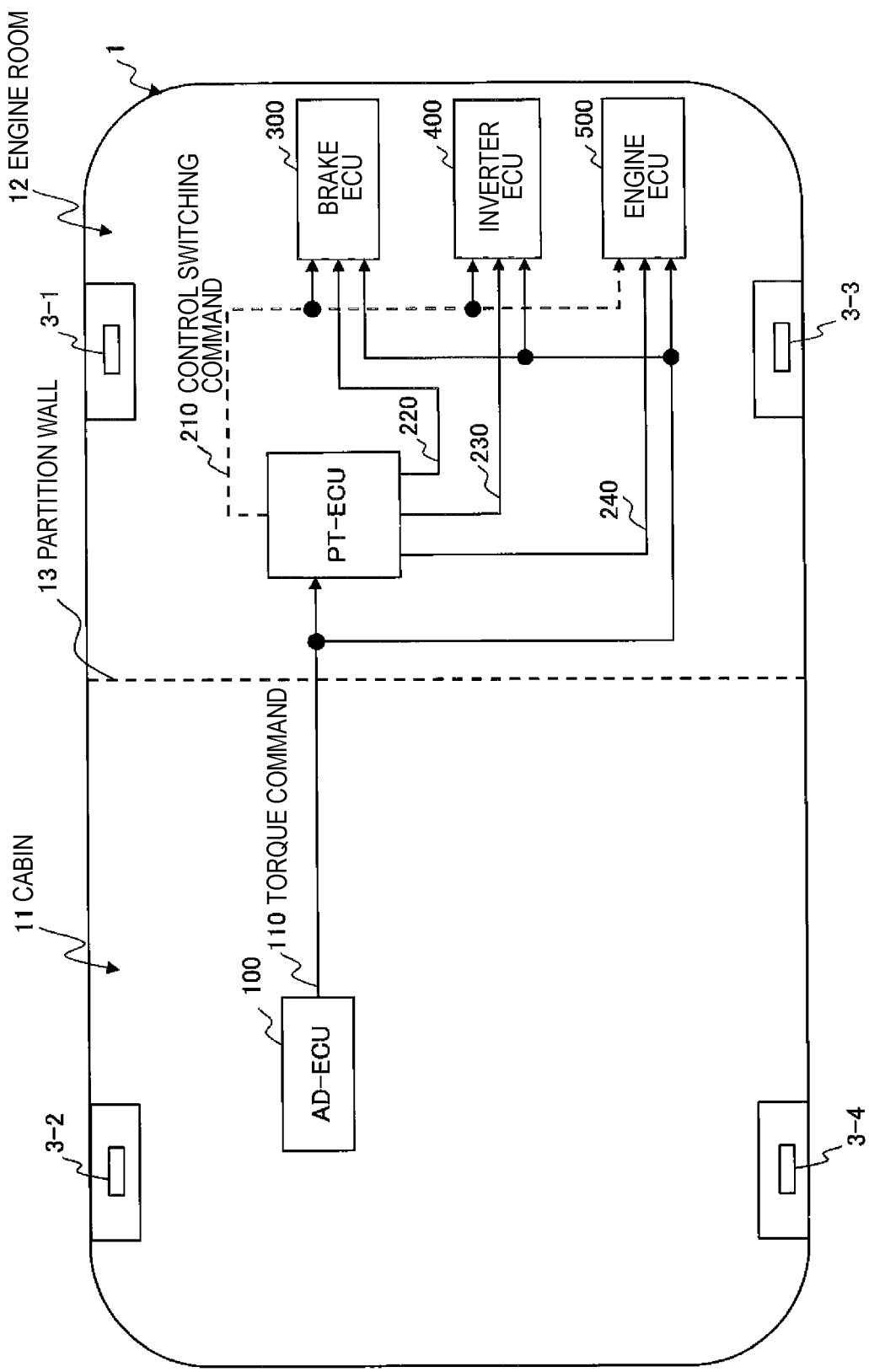
FIG. 9 is a block diagram illustrating an example of a vehicle control system in a fourth embodiment of the present invention.

FIG. 9 is a block diagram illustrating an example of a control system of the vehicle 1 in the fourth embodiment of the present invention. The fourth embodiment shows an example in which the third embodiment is applied to the second embodiment.

The AD-ECU 100 is disposed in the cabin 11, and the PT-ECU 200, the degeneration control unit 201, the brake ECU 300, the inverter ECU 400, and the engine ECU 500 are disposed in the engine room 12.

The distance between the AD-ECU 100 and the PT-ECU 200 also increases, but a signal of only the torque command 110 is transmitted in this line.

In the fourth embodiment, as in the third embodiment, the cooling of the AD-ECU 100 can be promoted and the stable operation can be guaranteed by optimizing the arrangement in the vehicle 1 in view of the generated heat amount of each ECU.

Fifth Embodiment

Figure 10:
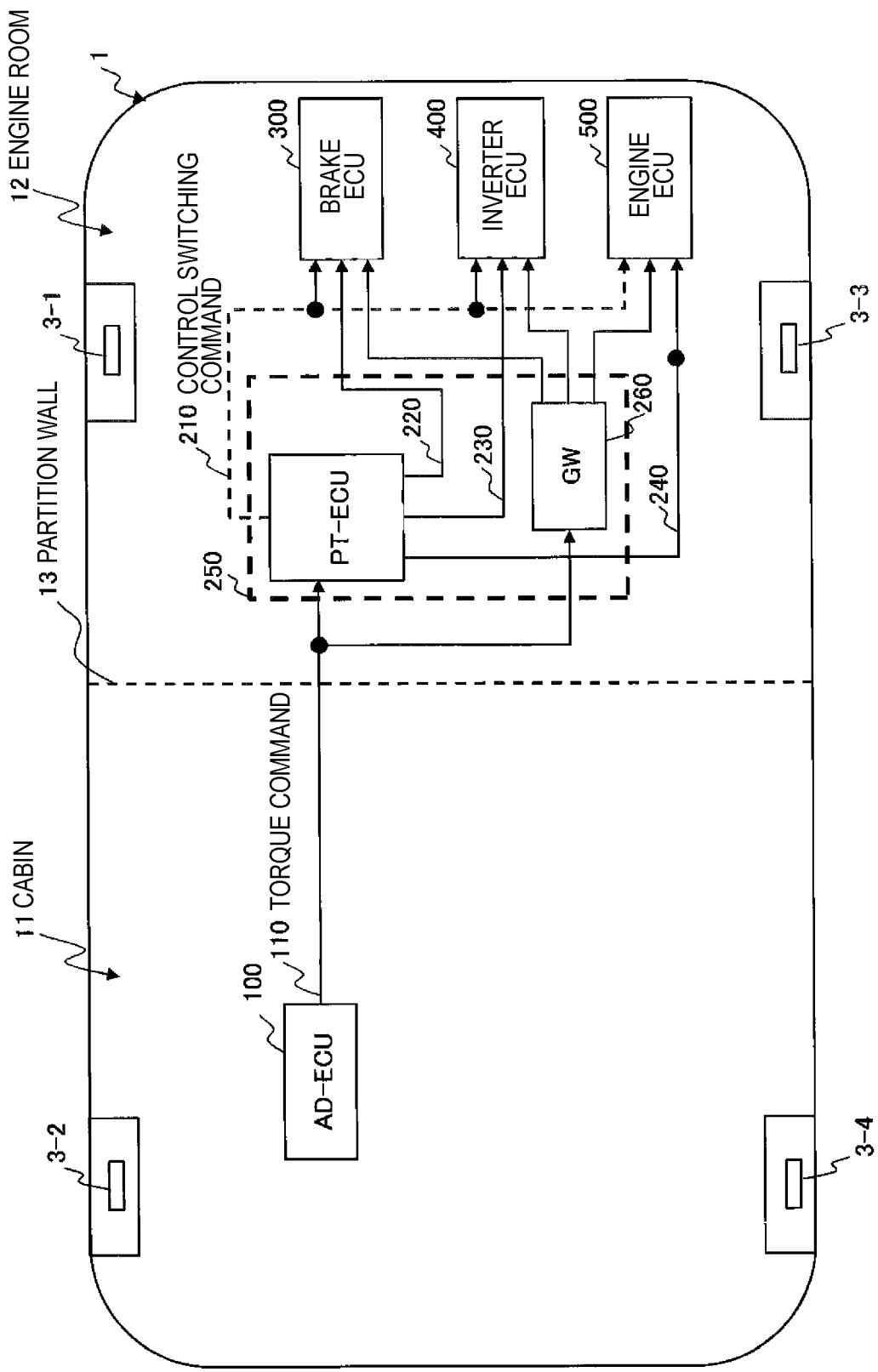
FIG. 10 is a block diagram illustrating an example of a vehicle control system in a fifth embodiment of the present invention.

FIG. 10 is a block diagram illustrating an example of a layout of the vehicle 1 in the fifth embodiment of the present invention. The fifth embodiment is obtained by adding a gateway 260 that distributes the torque command 110 to the brake ECU 300, the inverter ECU 400, and the engine ECU 500 to the configuration of the fourth embodiment, and further adding a housing 250 that accommodates the PT-ECU 200 and the gateway 260. Other configurations are the same as those of the fourth embodiment.

The distance between the AD-ECU 100, and the PT-ECU 200 and a gateway 202 increases, but a signal of only the torque command 110 is connected in this line. By mounting the PT-ECU 200 and the gateway 202 in the same housing 250, noise can be reduced.

The housing 250 may accommodate the brake ECU 300, the inverter ECU 400, and the engine ECU 500. Furthermore, a hub or a switch can be used instead of the gateway 260.

Sixth Embodiment

Figure 11:
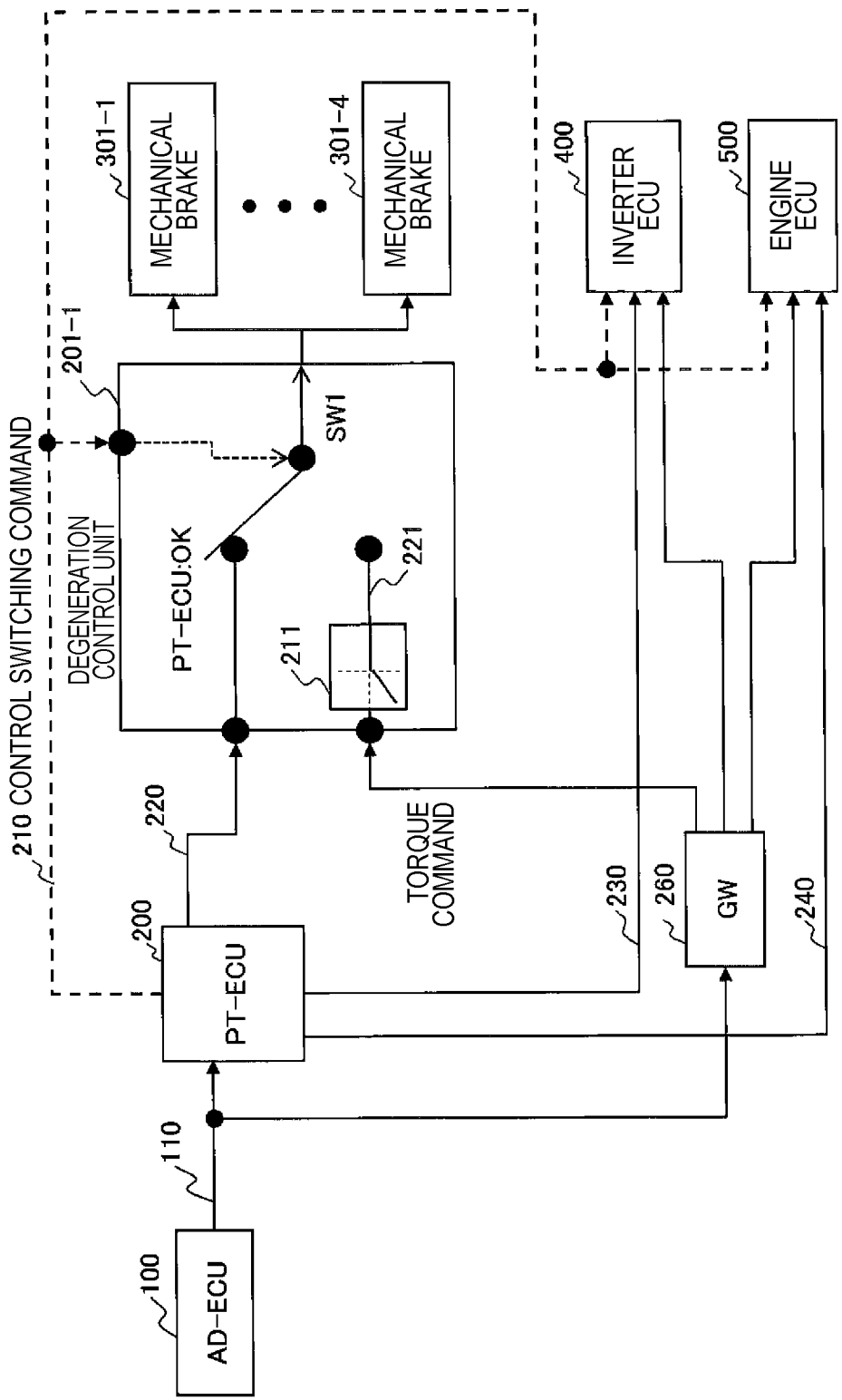
FIG. 11 is a block diagram illustrating in an example of a vehicle control system in a sixth embodiment of the present invention.

FIG. 11 is a block diagram illustrating an example of a control system of the vehicle 1 in the sixth embodiment of the present invention. In the fifth embodiment, a degeneration control unit 201-1 including the switch SW1 that switches between the brake command 220 and the abnormal-time brake command 221 is provided in the configuration of the fifth embodiment. As described in the third embodiment, the mechanical brakes 301-1 to 301-4 in which the brake ECU 300 and the mechanical brake 3 are integrated are connected to the degeneration control unit 201-1. Other configurations are similar to those of the fifth embodiment.

In the sixth embodiment, only the brake ECU 300 is connected to the brake command from the degeneration control unit 201-1. The other is an example in which the switch SW2 and a function of setting a positive value of the torque command 110 as a command value of the inverter ECU 40 is provided in the inverter ECU 400, and the switch SW3 and a function of setting as a command value of the engine ECU 50 based on the torque command 110 is mounted in the engine ECU 500, as in the fifth embodiment.

The ECU of the mechanical brake 301 is often mounted in a brake caliper by being mechanically and electrically integrated with a wheel. In this case, it is difficult to use a multi-core electric wire as an electric wire connecting the brake ECU and the vehicle body. Therefore, this is an effective embodiment for reducing the number of networks connected to the brake ECU to one.

As illustrated in FIG. 10 of the fifth embodiment, the PT-ECU 200, the gateway 202, and the degeneration control unit 201-1 can be mounted in the same housing 250, or the PT-ECU 200, the gateway 202, the degeneration control unit 201-1, the inverter ECU 400, and the engine ECU 500 can be mounted in the same housing 250.

Seventh Embodiment

Figure 12:
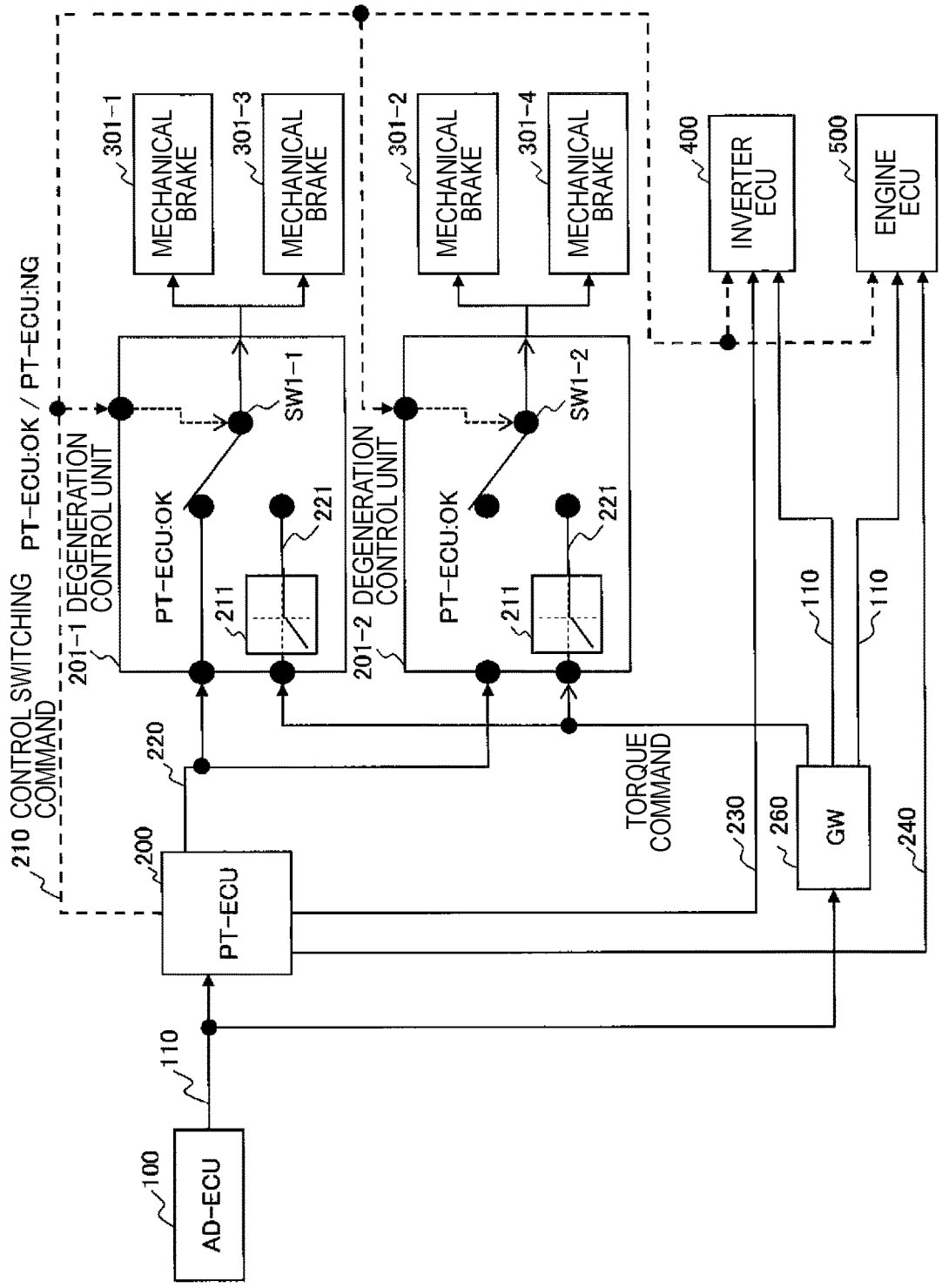
FIG. 12 is a block diagram illustrating an example of a vehicle control system in a seventh embodiment of the present invention.

FIG. 12 is a block diagram illustrating an example of a control system of the vehicle 1 in the seventh embodiment of the present invention. The seventh embodiment shows an example in which the degeneration control unit 201-1 of the sixth embodiment is divided into a degeneration control unit 201-1 that controls the mechanical brakes 301-1 and 301-3 on the front wheel side and a degeneration control unit 201-2 that controls the mechanical brakes 301-2 and 301-4 on the rear wheel side. Other configurations are similar to those of the sixth embodiment.

The degeneration control unit 201-2 includes a switch SW1-2 that switches between the brake command 220 and the abnormal-time brake command 221, as in the degeneration control unit 201-1 of the sixth embodiment.

By making the brake degeneration control units 201-1 and 201-2 redundant with respect to the control of the mechanical brake 301, it is possible to avoid the degeneration control unit 201 from becoming a single failure point. In this case, it is desirable to connect the brakes on both the right and left sides to the degeneration control units 201-1 and 201-2.

As a specific example, the degeneration control unit 201-1 is connected to the right front and left front mechanical brakes 301-1 and 301-3, and the degeneration control unit 201-2 is connected to the right rear and left rear mechanical brakes 301-2 and 301-4. In this case, degeneration control unit 201-1 may be installed in engine room 12, and degeneration control unit 201-2 may be installed in the rear of vehicle 1.

Alternatively, it is conceivable that the degeneration control unit 201-1 is connected to the right front and left rear mechanical brakes 301-2 and 301-3, and the degeneration control unit 201-2 is connected to the right rear and left front mechanical brakes 301-1 and 301-4.

Conclusion

As described above, the vehicle control system of the first to seventh embodiments can have the following configuration.

(1) In a vehicle control system that controls a vehicle (1) according to a travel environment of the vehicle (1), the vehicle control system includes a sensor (travel environment sensor 10) that detects a travel environment of the vehicle (1), a first control unit (AD-ECU 100) that includes a processor and a memory, and outputs a first control signal (torque command 110) based on information detected by the sensor, a second control unit (powertrain ECU 200) that includes a processor (20) and a memory (23), and receives the first control signal (torque command 110) to output second control signals (brake command 220, inverter command 230), and a third control unit (degeneration control unit 201, brake ECU 300, inverter ECU 400) that includes a processor (251) and a memory (252), and receives the first control signal (110) and the second control signals (220, 230) to drive control devices (mechanical brake 3, motor 45) based on either the first control signal (110) or the second control signals (220, 230).

With the above configuration, when the PT-ECU 200 is normal, the optimum brake command 220 and the inverter command 230 can be realized based on the torque command 110 from the AD-ECU 100, and the operation with high energy efficiency can be realized.

On the other hand, when an abnormality occurs in the PT-ECU 200, the degeneration control unit 201 switches the torque according to the torque command 110 to the second control signals from the auxiliary brake control unit 211, the auxiliary inverter control unit 212 and the auxiliary engine control unit 213 to perform control without using the optimization function of the PT-ECU 200, so that it is possible to continue traveling of the vehicle 1 while simplifying the control content and reducing the manufacturing cost of the degeneration control unit 201.

(2) In the vehicle control system according to (1), the third control unit (degeneration control unit 201, brake ECU 300, inverter ECU 400) controls the control device (3, 45) based on the second control signals (220, 230) when the second control unit (200) is normal, and controls the control devices (3, 45) based on the first control signal (torque command 110) when an abnormality occurs in the second control unit (200).

When an abnormality occurs in the PT-ECU 200, the degeneration control unit 201 switches to the abnormal-time brake command 221 and the abnormal-time inverter command 231 instead of the brake command 220 and the inverter command 230 from the PT-ECU 200, so that it is possible to continue traveling of the vehicle 1 while simplifying the control content and reducing the manufacturing cost of the degeneration control unit 201.

(3) In the vehicle control system according to (2), the third control unit is a brake control unit (brake ECU 300) that controls a mechanical brake (3) as the control device, and controls the mechanical brake (3) with a negative value of the first control signal (torque command 110) as a brake command (221) when an abnormality occurs in the second control unit (200).

When an abnormality occurs in the PT-ECU 200, the brake ECU 300 controls the mechanical brake 3 with a negative value of the torque command 110 as the abnormal-time brake command 221, so that it is possible to continue traveling of the vehicle 1 even when an abnormality occurs in the PT-ECU 200 while reducing the manufacturing cost of the brake ECU 300.

(4) In the vehicle control system according to (2), the third control unit is an inverter control unit (400) that controls an inverter (44) as the control device, and controls the inverter (200) with a positive value of the first control signal (torque command 110) as an inverter command (221) when an abnormality occurs in the second control unit (44).

When an abnormality occurs in the PT-ECU 200, the inverter ECU 400 controls the inverter 44 with a positive value of the torque command 110 as the abnormal-time inverter command 231, so that it is possible to continue traveling of the vehicle 1 even when an abnormality occurs in the PT-ECU 400 while reducing the manufacturing cost of the inverter ECU 200.

(5) The vehicle control system according to (3), further includes an inverter control unit (400) that receives the first control signal (110) and the second control signal (230) to control an inverter (44) as the control device, the inverter control unit controls the inverter (44) with a positive value of the first control signal (110) as an inverter command (221) when an abnormality occurs in the second control unit (200).

When an abnormality occurs in the PT-ECU 200, the inverter ECU 400 controls the inverter 44 with a positive value of the torque command 110 as the abnormal-time inverter command 231, so that it is possible to continue traveling of the vehicle 1 even when an abnormality occurs in the PT-ECU 400 while reducing the manufacturing cost of the inverter ECU 200.

(6) In the vehicle control system according to (1), the first control unit is an autonomous driving controller (AD-ECU 100) that outputs a torque command (110) as the first control signal, the second control unit is a powertrain controller (PTECU 200) that outputs a first brake command (220) and a first inverter command (230) according to a value of the torque command (110), and the third control unit (201) outputs a negative value of the torque command (110) as a second brake command (221), and outputs a positive value of the torque command as an acceleration second inverter command (231) when an abnormality occurs in the powertrain controller (200).

When an abnormality occurs in the PT-ECU 200, the degeneration control unit 201 controls the mechanical brake 3 with a negative value of the torque command 110 as the abnormal-time brake command 221 and controls the inverter 44 with a positive value of the torque command 110 as the abnormal-time inverter command 231 instead of the brake command 220 and the inverter command 230, so that it is possible to continue traveling of the vehicle 1 even when an abnormality occurs in the PT-ECU 200, while reducing the manufacturing cost of the degeneration control unit 201.

(7) In the vehicle control system according to (6), the third control unit (201) includes switching units (SW1 to SW3) that switch between the first brake command (220) and the first inverter command (230), and the second brake command (221) and the second inverter command (231) according to the presence or absence of the abnormality of the second control unit (200) to perform an output.

When an abnormality occurs in the PT-ECU 200, the degeneration control unit 201 switches the brake command 220 and the inverter command 230 to the abnormal-time brake command 221 and the abnormal-time inverter command 231 to control the mechanical brake 3 and the inverter 44, so that it is possible to continue traveling of the vehicle 1 even when an abnormality occurs in the PT-ECU 200 while reducing the manufacturing cost of the degeneration control unit 201.

(8) In the vehicle control system according to (7), the third control unit (201) further includes a drive control unit (auxiliary brake control unit 211, auxiliary inverter control unit 212) that receives the torque command (110) to output a second brake command (221) or a second inverter command (231) based on the torque command, and the switching units (SW1 to SW3) switch the first brake command (220) or the first inverter command (230) to the second brake command (221) or the second inverter command (231) to perform an output when an abnormality occurs in the powertrain controller (200).

When an abnormality occurs in the PT-ECU 200, the degeneration control unit 201 switches the brake command 220 and the inverter command 230 to the abnormal-time brake command 221 and the abnormal-time inverter command 231 to control the mechanical brake 3 and the inverter 44, so that it is possible to continue traveling of the vehicle 1 even when an abnormality occurs in the PT-ECU 200 while reducing the manufacturing cost of the degeneration control unit 201.

(9) In the vehicle control system according to (7), the third control unit further includes a drive control unit (211) that receives the torque command (110) to output a second brake command (221) based on the torque command and a brake control unit (31) that receives an output of the switching unit (SW1) to control the mechanical brake (3), and the switching unit (SW1) switches the first brake command (220) to the second brake command (221) to perform an output when an abnormality occurs in the powertrain controller (200).

When an abnormality occurs in the PT-ECU 200, the brake ECU 300 switches the brake command 220 to the abnormal-time brake command 221 to control the mechanical brake 3, so that it is possible to continue traveling of the vehicle 1 even when an abnormality occurs in the PT-ECU 200 while reducing the manufacturing cost of the brake ECU 300.

(10) The vehicle control system according to (7), the third control unit further includes a drive control unit (auxiliary inverter control unit 212) that receives the torque command (110) to output a second inverter command (231) based on the torque command (110), and an inverter control unit (41) that receives an output of the switching unit (SW2) to control the inverter (44), and the switching unit (SW2) switches the first inverter command (230) to the second inverter command (231) to perform an output when an abnormality occurs in the powertrain controller (200).

When an abnormality occurs in the PT-ECU 200, the inverter ECU 400 switches the inverter command 230 to the abnormal-time inverter command 231 to control the inverter 44, so that it is possible to continue traveling of the vehicle 1 even when an abnormality occurs in the PT-ECU 400 while reducing the manufacturing cost of the inverter ECU 200.

The present invention is not limited to the embodiments described above, but includes various modifications. For example, the above-described embodiments have been described in detail for easy understanding of the present invention, and the present invention is not necessarily limited to embodiments having all the configurations described. Moreover, it is possible to replace part of the configuration of an embodiment with the configuration of another embodiment, and it is also possible to add the configuration of another embodiment to the configuration of an embodiment. In addition, for part of the configuration of each embodiment, any addition, deletion, or substitution of other configurations can be applied alone or in combination.

Further, part or all of the above-described respective configurations, functions, processing units, processing means and the like may be realized by hardware, for example, by designing them with an integrated circuit. Further, the above-described respective configurations, functions, and the like may be realized by software with the processor interpreting and executing programs for realizing the respective functions. Information such as programs, tables, and files that implement each function is stored in memory and it can be placed in a recording device such as a hard disk or a solid state drive (SSD), or a recording medium such as an IC card, an SD card, or a DVD.

In addition, the control lines and the information lines indicate what is considered to be necessary for the description, and do not necessarily indicate all the control lines and the information lines on the product. In practice, it may be considered that almost all configurations are connected to each other.

REFERENCE SIGNS LIST 30, 300 brake ECU
40, 400 inverter ECU
50, 500 engine ECU
100 AD-ECU
200 PT-ECU
201 degeneration control unit
211 auxiliary brake control unit
212 auxiliary inverter control unit
213 auxiliary engine control unit

The invention claimed is:

1. A vehicle control system that controls a vehicle according to a travel environment of the vehicle, the vehicle control system comprising:
   a sensor that detects a travel environment of the vehicle, the sensor configured to transmit detected travel environment information;
   a first control unit including a processor and a memory, the first control unit being configured to output a first control signal based on the travel environment information detected by the sensor and received directly from the sensor, the first control unit being local in the vehicle control system;
   a second control unit including a processor and a memory, the second control unit being configured to receive the first control signal to output a second control signal; and
   a third control unit including a processor and a memory, the third control unit being configured to receive the first control signal and the second control signal to drive a control device based on either the first control signal or the second control signal, the third control unit including a switching unit configured to execute a calculation for calculating a control switching command, the switching unit including a first processor and a second processor configured to execute the calculation and output a calculation result, wherein the third control unit is configured to:
      control the control device based on the second control signal when the calculation result of the first processor is the same as the calculation result of the second processor, and
      control the control device based on the first control signal in response to receiving the control switching command when an abnormality occurs in the second control unit, the abnormality occurring when the calculation result of the first processor is different than the calculation result of the second processor.

2. The vehicle control system according to claim 1, wherein
   the third control unit is a brake control unit that controls a mechanical brake as the control device, and controls the mechanical brake with a negative value of the first control signal as a brake command when the abnormality occurs in the second control unit.

3. The vehicle control system according to claim 2, further comprising
   an inverter control unit that receives the first control signal and the second control signal to control an inverter as the control device,
   wherein the inverter control unit controls the inverter with a positive value of the first control signal as an inverter command when the abnormality occurs in the second control unit.

4. The vehicle control system according to claim 1, wherein
   the third control unit is an inverter control unit that controls an inverter as the control device, and controls the inverter with a positive value of the first control signal as an inverter command when the abnormality occurs in the second control unit.

5. The vehicle control system according to claim 1,
   wherein the first control unit is an autonomous driving controller that outputs a torque command as the first control signal, wherein the second control unit is a powertrain controller that outputs a first brake command and a first inverter command according to a value of the torque command, and wherein the third control unit outputs a negative value of the torque command as a second brake command, and outputs a positive value of the torque command as an acceleration second inverter command when an abnormality occurs in the powertrain controller.

6. The vehicle control system according to claim 5, wherein the switching unit switches between the first brake command and the first inverter command, and the second brake command and the second inverter command according to presence or absence of an abnormality of the second control unit to perform an output.

7. The vehicle control system according to claim 6, wherein the third control unit further includes a drive control unit that receives the torque command to output a second brake command or a second inverter command based on the torque command, and wherein the switching unit switches the first brake command or the first inverter command to the second brake command or the second inverter command to perform an output when the abnormality occurs in the powertrain controller.

8. The vehicle control system according to claim 6, wherein the third control unit further includes a drive control unit that receives the torque command to output a second brake command based on the torque command, and a brake control unit that receives an output of the switching unit to control a mechanical brake, and wherein the switching unit switches the first brake command to the second brake command to perform an output when the abnormality occurs in the powertrain controller.

9. The vehicle control system according to claim 6, wherein the third control unit further includes a drive control unit that receives the torque command to output a second inverter command based on the torque command, and an inverter control unit that receives an output of the switching unit to control an inverter, and wherein the switching unit switches the first inverter command to the second inverter command to perform an output when the abnormality occurs in the powertrain controller.

* * * * *